(12) United States Patent
Henderson et al.

(10) Patent No.: US 6,754,233 B1
(45) Date of Patent: Jun. 22, 2004

(54) METHOD AND APPARATUS FOR TRANSMITTING DATA BETWEEN A CENTRAL SITE AND MULTIPLE DATA SUBSCRIBERS

(75) Inventors: P. Michael Henderson, Tustin, CA (US); Kenneth Ko, Clearwater, FL (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 0 days.

(21) Appl. No.: 09/371,424

(22) Filed: Aug. 10, 1999

(51) Int. Cl.⁷ .................................................. H04J 1/02
(52) U.S. Cl. ............. 370/493; 370/395.71; 370/395.72; 370/487; 370/490; 375/219; 379/93.08
(58) Field of Search ............................... 370/282, 295, 370/296, 395.62, 395.63, 395.7, 395.71, 395.72, 485, 486, 487, 516, 517, 490, 493, 535, 537; 375/219, 220, 222, 261, 371, 372; 379/93.14, 93.05, 93.08

(56) References Cited

U.S. PATENT DOCUMENTS

| | | | | |
|---|---|---|---|---|
| 4,890,316 A | * | 12/1989 | Walsh et al. ................... | 379/98 |
| 5,247,347 A | | 9/1993 | Litteral et al. ................. | 358/85 |
| 5,668,857 A | | 9/1997 | McHale ..................... | 379/93.07 |
| 5,784,683 A | | 7/1998 | Sistanizadeh et al. ........ | 455/5.1 |
| 5,790,543 A | * | 8/1998 | Cloutier ....................... | 370/395 |
| 5,898,761 A | * | 4/1999 | McHale et al. ........... | 379/93.01 |
| 6,084,885 A | * | 7/2000 | Scott .......................... | 370/455 |
| 6,088,385 A | * | 7/2000 | Liu .............................. | 375/219 |
| 6,137,839 A | * | 10/2000 | Mannering et al. ......... | 375/260 |
| 6,151,335 A | * | 11/2000 | Ko et al. ..................... | 370/487 |
| 6,282,273 B1 | | 8/2001 | McHale et al. ........... | 379/93.28 |
| 6,442,195 B1 | * | 8/2002 | Liu et al. ..................... | 375/220 |
| 6,510,152 B1 | | 1/2003 | Gerszberg et al. .......... | 370/352 |

OTHER PUBLICATIONS

P. Michael Henderson et al., "Method and Apparatus for Handling Multiple Data Subscribers at a Central Site", Ser. No. 09/274,845, Filing Date: Mar. 23, 1999 (Related Application).

Henderson, P. Michael, U.S. patent application Ser. No. 09/274,845, Filed on Mar. 23, 1999 (Related Application including claims amended on Jun. 27, 2003).

Henderson et al, Ser. No. 09/274,845, filed on Mar. 23, 1999, (Amended Claims Only).

Henderson et al., Patent Appn S/N 09/274,845, filed on Mar. 23, 1999, (Claims Only—as amended on Jan. 9, 2004).

* cited by examiner

Primary Examiner—Seema S. Rao
Assistant Examiner—Shick Hom (57) ABSTRACT

A communication system for transmitting voice and data information is disclosed. The communication system includes subscriber modems, system converters and at least one system data pump. The system also includes buffer memory interposed, in the upstream direction, between the converters and the data pump to allow subscriber modems to send a predetermined amount of information to the data pump on demand.

14 Claims, 4 Drawing Sheets

METHOD AND APPARATUS FOR TRANSMITTING DATA BETWEEN A CENTRAL SITE AND MULTIPLE DATA SUBSCRIBERS

CROSS REFERENCE TO RELATED APPLICATIONS

This Patent Application is related to U.S. Patent Application entitled "Method and Apparatus for Handling Multiple Data Subscribers at a Central Site", filed on Mar. 23, 1999 and assigned Ser. No. 09/274,845.

FIELD OF THE INVENTION

The present invention generally relates to electronic data communication systems. More particularly, the invention relates to methods and apparatus for transmitting information between a central site and multiple electronic data subscribers.

BACKGROUND OF THE INVENTION

The advent of Internet service and video communication, among other advances associated with the transmission of electronic data, has generated an increased consumer desire for electronic data transfer to and from an equipment terminal such as a computer, a television, or the like. This increased desire has generated an increased demand for communication providers, such as telephone companies and Internet service providers, to handle increasing amounts of data.

Typical communication systems include existing telephone infrastructures such as the public switched telephone network (PSTN) to transfer both telephone service (e.g., voice band data) and electronic data (e.g., video with or without accompanying audio and/or internet information) to and from a telephone or terminal. Using an existing telephone network infrastructure to transfer data to and from a terminal allows communication providers such as telephone companies to leverage their existing telephone connections to households for both voice and data transfer. In particular, existing PSTN phone lines, typically twisted-pair wires, between a subscriber and a central site such as a central office of a PSTN may be used to transmit both telephone service (voice) and electronic data. The twisted-pair wires may transmit data at frequency bandwidths ranging up to several MHZ; however, the PSTN generally includes filters and data sampling apparatus that limit voice frequency bandwidth to about 3 kHz. Consequently, data transfer over the PSTN is also generally limited to a bandwidth of about 3 kHz, absent modifications to the PSTN.

Digital subscriber line (xDSL) communication systems, which may include asymmetric digital subscriber line, symmetric digital subscriber line, high-speed digital subscriber line, very high-speed digital subscriber line, or other digital subscriber line technologies, and the like, may be used to transmit information over twisted-pair wires at a greater bandwidth; e.g., up to several MHZ by bypassing the voice frequency digital sampling apparatus and at least some of the PSTN filters. The xDSL systems generally include a subscriber modem attached to a subscriber terminal and a corresponding system modem located within or proximate a central office of the PSTN or a similar central site within the telephone system. The system modem typically includes an analog-to-digital converter, a digital-to-analog converter, and a bit pump to convert electronic information into an appropriate format for transmission over PSTN lines.

Because space requirements and power consumption at the central office increase with each additional modem in the central office, it is desirable to minimize or reduce the number of modems at the central office. Also, data transmitted over communication lines typically occurs in bursts; i.e., the data is not always transmitted in a continuous stream. Hence, the central office is theoretically able to provide data transfer service to a number of subscribers that exceeds the actual number of modems resident at the central office. In other words, it may provide oversubscription of data transfer services.

An xDSL system that allows oversubscription of consumer modems to a central office is disclosed in U.S. Pat. No. 5,668,857, issued Sep. 16, 1997 to McHale. The system disclosed in the McHale patent includes a communication server, located within a central office of a PSTN, which includes a switch, a modem pool, and a controller connected to both the switch and the modem pool. The controller polls the subscribers or a subset thereof and determines whether a particular "polled" subscriber is attempting to send data to the central office. If an attempt is detected, the controller directs the switch to couple the subscriber transfer line to a selected subset of modems in the modem pool. The switch disclosed in the McHale patent is an analog device; i.e., the format of the signal is analog on both the input and output data lines connected to the switch. An output signal from the switch is transferred to the system modem, which converts the signal from an analog format to a digital format.

Analog switching of data lines connected to modems may be inadequate in several regards. For example, analog switching may be inefficient because, in part, when data is transmitted to a subscriber modem, time is required to determine which system modem will connect to the subscriber modem, and time is required to establish the connection. Systems employing analog switching techniques may require additional system modems located within or near the central office to overcome the time requirements for modem selection and switching.

Additional problems with using analog switches include the generation of transients in a circuit as the circuit is switched. Additionally, analog switching may be unreliable and require significant board space at the central office. For these reasons and others, analog switching of data communication lines causes transmission quality problems and may be relatively expensive. Therefore, improved methods and apparatus are desirable for efficiently handling multiple data transmission subscribers.

The system disclosed in the McHale patent uses polling devices and techniques to determine when and if a subscriber modem is attempting to send payload information to the communication server. The polling device polls subscriber modems (one at a time) that may be attempting to send information to the server. The polling circuitry of the device dwells on each subscriber line for a period of time sufficient to allow the polling device to determine whether the corresponding subscriber modem is ready to transfer information to the server. The subscriber modem may indicate readiness by continuously or repeatedly sending ready signals to the system modem until the system modem acknowledges the ready signal. If, during the dwell period, a modem sends a signal indicating that the modem is ready to transfer information to the communication server, the subscriber modem is connected to a communication server modem. No subscriber can send any payload information to the server until the polling circuitry is coupled to the particular subscriber modem. Although this polling technique allows oversubscription of subscriber modems relative to the server modem, this technique is relatively inefficient because, among other reasons, subscriber modems must wait until the modem is polled to send payload information to the communication server. Thus, only one subscriber modem coupled to the polling device may send payload information to the server at any one time. The remaining modems coupled to the polling device must wait until polled to send payload information to the server, resulting in relatively inefficient use of the system modem. Therefore, improved methods and apparatus for efficiently handling multiple data transmission subscribers are desirable.

SUMMARY OF THE INVENTION

The present invention provides improved method and apparatus for transmitting voice and electronic data over a data communication system. The way in which the present invention addresses the drawbacks of the now-known data communication systems and components thereof is described in greater detail hereinbelow; however, in general, in accordance with various aspects of the present invention, the inventive apparatus provides an improved communication system with a fewer number of system data pumps than a number of subscribers desiring data communication capability. In addition, the inventive system is configured such that the system does not require analog switching to connect subscribers to the data pumps. Thus, unwanted problems such as time delay and switching transients associated with analog switching methods and apparatus are reduced. Furthermore, the system is configured to allow subscribers to send a predetermined amount of information toward the data pump on demand (without first being polled by the system data pump).

In accordance with an exemplary embodiment of the present invention, the communication system includes a number of data converters configured to transform data between a form suitable for transmission between the subscriber modems and the converters and a form suitable for the data pump. In accordance with a further aspect of this embodiment, a plurality of data converters are coupled to a single data pump.

In accordance with another embodiment of the present invention, each data converter includes an analog front end configured to communicate with the subscriber modem or terminal, an analog-to-digital converter, and a digital-to-analog converter.

In accordance with yet another embodiment of the present invention, the system includes buffer memory interposed between the data converter and the data pump. The buffer memory is configured to store a fixed amount of information until the data pump is ready to receive the information. The buffer memory allows subscribers to send a fixed amount of information to the buffer without waiting for availability of or acknowledgment from the system data pump. In accordance with this embodiment, a predetermined maximum amount of information can be sent from the subscriber modem to the corresponding buffer memory without the subscriber modem receiving an acknowledgment signal from the data pump and without the subscriber modem being polled. This allows more efficient transmission of data between subscribers and a central site.

In accordance with another embodiment of the present invention, the data pump broadcasts downstream data to all subscriber modems or terminals attached to the data pump. The downstream data includes information to identify the subscriber modem or terminal which is to convert and decode the data for a particular subscriber's use. In addition, the downstream data includes information that allows all modems coupled to the data pump to maintain synchronization with the pump. In accordance with a further aspect of this embodiment, the downstream data includes an acknowledgment that indicates to the subscriber modem that the subscriber modem may send additional information.

In accordance with a further embodiment of the present invention, information transmitted from a subscriber to a corresponding data converter includes information that allows the subscriber modem and the data pump to restore synchronization.

In accordance with yet another embodiment of the present invention, electronic information is transmitted over a communication system from a subscriber modem to a system splitter that is located at a central site. The information is filtered into a low frequency bandwidth and a high frequency bandwidth. The high frequency bandwidth data is transmitted to a system converter and converted at the converter into digital format. The digital information is transmitted to a storage buffer, and then transmitted to a system data pump.

BRIEF DESCRIPTION OF THE DRAWINGS

A more complete understanding of the present invention may be derived by referring to the detailed description and claims, considered in connection with the figures, wherein like reference numbers refer to similar elements throughout the figures, and:

DETAILED DESCRIPTION OF EXEMPLARY EMBODIMENTS

The present invention provides a system and system components for high-speed data transmission using a plurality of subscriber modems connected to a lesser number of system data pumps. While the present invention may be used to transmit various types of electronic data, the invention is conveniently described hereinbelow in connection with a system that is configured to transmit both voice and electronic data information.

Figure 1:
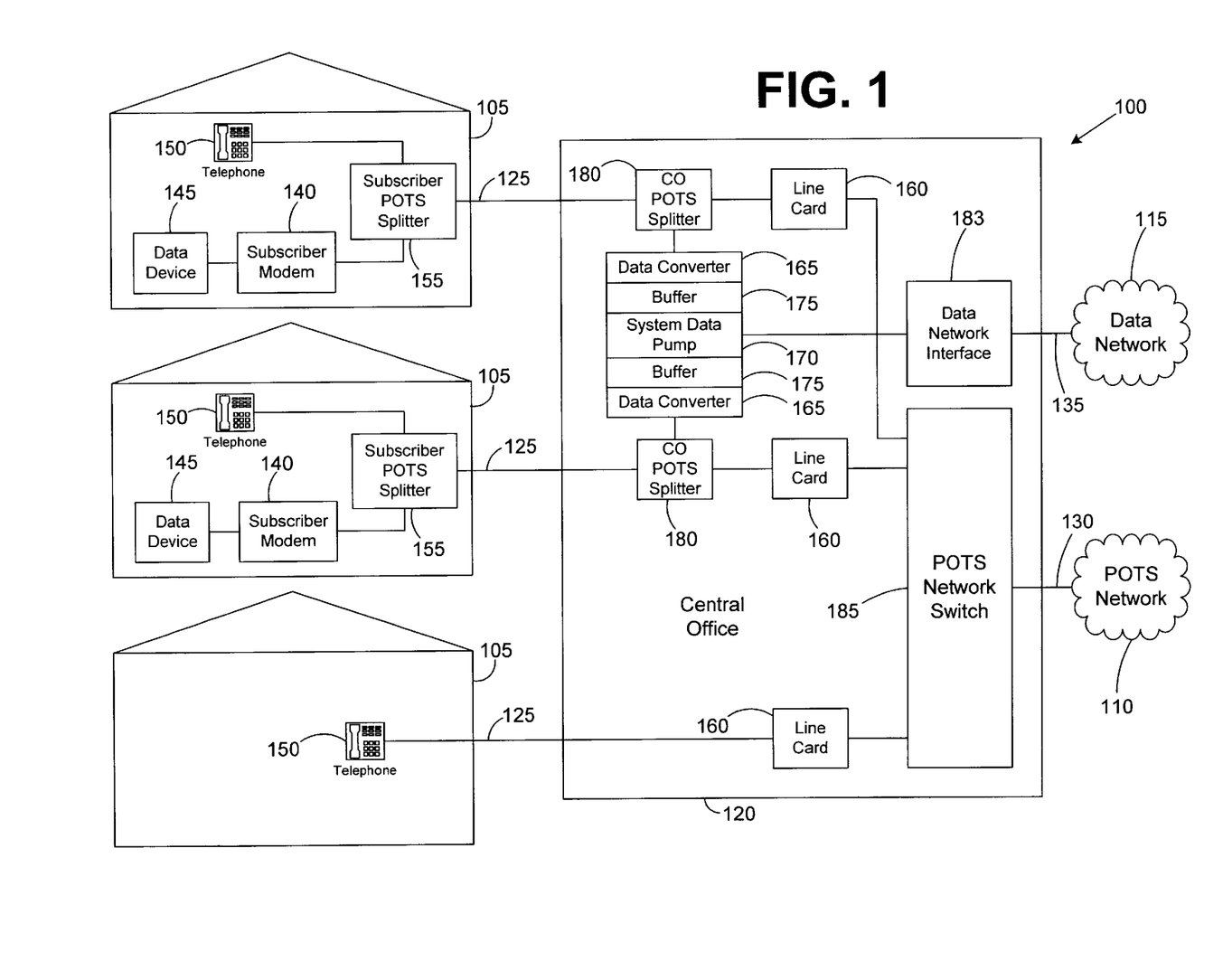
FIG. 1 is a schematic illustration of a communication system in accordance with an exemplary embodiment of the present invention.

FIG. 1 illustrates a communication system 100 in accordance with an exemplary embodiment of the present invention. System 100 is generally configured to facilitate voice and data transmission between a subscriber 105 and a voice network 110, a data network 115, or a combination thereof.

System 100 is suitably configured such that information travels a portion of the distance between subscriber 105 and network 110 and 115 in analog format and a portion of the distance in digital format. In particular, information preferably travels between subscriber 105 and a central location or hub such as a central office 120 of a publicly switched telephone network (PSTN) in analog format over a transmission line 125, and between central office 120 and network 110 over a transmission line 130 and between central office 120 and network 115 over a transmission line 135 in digital format. Accordingly, central office 120 preferably includes apparatus capable of transforming voice information, data information, or both into appropriate formats for transmission between subscriber 105 and networks 110 and 115. Although networks 110 and 115 and transmission lines 130 and 135 are shown separated in FIG. 1, networks 110 and 115, lines 130 and 135, or a combination thereof may be combined. For example, networks 110 and 115 may share a common hub and lines 130 and 135 may be combined between central site 120 and the hub.

As noted above, voice and data information are preferably transmitted between subscribers 105 and central office 120 using line 125. Transmission line 125 preferably includes a medium suitable for electronic data transfer, such as wire, coaxial cable, fiber optic cable, or the like. In an exemplary embodiment of the present invention, line 125 is a twisted-pair wire. Use of twisted-pair wires is advantageous in several respects. In particular, the "plain old telephone system" (POTS) generally includes twisted-pair wire already connected to actual or potential subscribers 105. The twisted-pair wire is capable of transmitting information to central office 120 at rates reaching several megabits per second (Mbps). In accordance with alternative embodiments of the present invention, subscribers 105 may communicate with central office 120 using analog, digital or any other form of wireless or wired communication. Lines 130 and 135 may also include various media suitable for analog or digital communication; however, in an exemplary embodiment of the present invention, lines 130 and 135 are fiber optic cables and transmit information in digital format.

Subscriber 105 may include, among other things, user-end apparatus such as a subscriber modem 140, a terminal 145 (which may be integral with modem 140), and a voice band device 150, such as a telephone. Terminal 145 may include a computer, a CRT (cathode ray tube) display, a flat panel display, a television, or any other device capable of receiving or transmitting electronic information. Subscriber 105 may also include a frequency splitter 155 coupled to modem 140 and a voice band device 150. Although FIG. 1 shows only one device 150 and one terminal 145 attached to subscriber splitter 155, splitter 155 and any device configured to interface between line 125 and terminal 145 and device 150 are typically configured to communicate with any number and any combination of devices 150 and terminals 145. In other words, multiple devices 150 and terminals 145 may be connected to a single subscriber splitter 155 or various other interface devices.

Central office 120 or another suitable central site is configured to receive information from terminals 145 and/or devices 150 and transform the information into a format suitable for upstream travel to networks 110 and/or 115. Likewise, central office 120 is suitably configured to transform data from networks 110 and/or 115 into formats compatible with downstream travel to devices 150 and terminals 145.

To transform information into the appropriate format and in accordance with an exemplary embodiment of the present invention, central office 120 includes a converter 160 to convert voice information between digital and analog format, a converter 165 to convert data between digital and analog format, and a data pump 170 to transform the digital information into a suitable format for transmission between pump 170 and network 115. In addition, central office 120 also preferably includes a buffer or buffer memory device 175 interposed between converter 165 and pump 170 in the upstream direction to store information received from converter 165. Office 120 also includes a frequency splitter 180 to separate information into voice band (e.g., frequencies less than about 4 kHz) and data band (e.g., frequencies greater than about 25 kHz to a few MHZ), a data network interface 183 such as a digital subscriber line access multiplexer, and a POTS network switch 185.

System 100 may include one or more splitters 155, 180 to facilitate both voice and data transmission over line 125. In general, splitters 155 and 180 separate, superimpose, or both voice and data information from or onto line 125. Accordingly, subscribers 105 not requiring data transmission need not be connected to splitters 155 and/or 180. That is, subscribers 105 requiring only voice band transmission may be connected directly to converter 160. Splitters 155 and 180 allow simultaneous broadcast of both voice and data information over line 125 by separating the voice and data information into separate frequency bands such as the frequency bands noted above. Splitters 155 and 180 may also be configured to reduce interference between voice and data signals by, for example, providing a guard band between the data and voice frequencies, using noise cancellation techniques, and the like.

System frequency splitter 180 is configured to separate voice and data information (e.g., from line 125) for upstream travel and to superimpose voice and data information (e.g., onto line 125) for downstream travel. Splitter 180 may include active, passive, or both filters to separate information into high frequency data and low frequency voice bands. Although splitter 180 is shown in FIG. 1 as separated from converter 165 and buffer 175, splitters 180 may suitably be attached or integral with converter 165, buffer 175, or a combination thereof.

Figure 4:
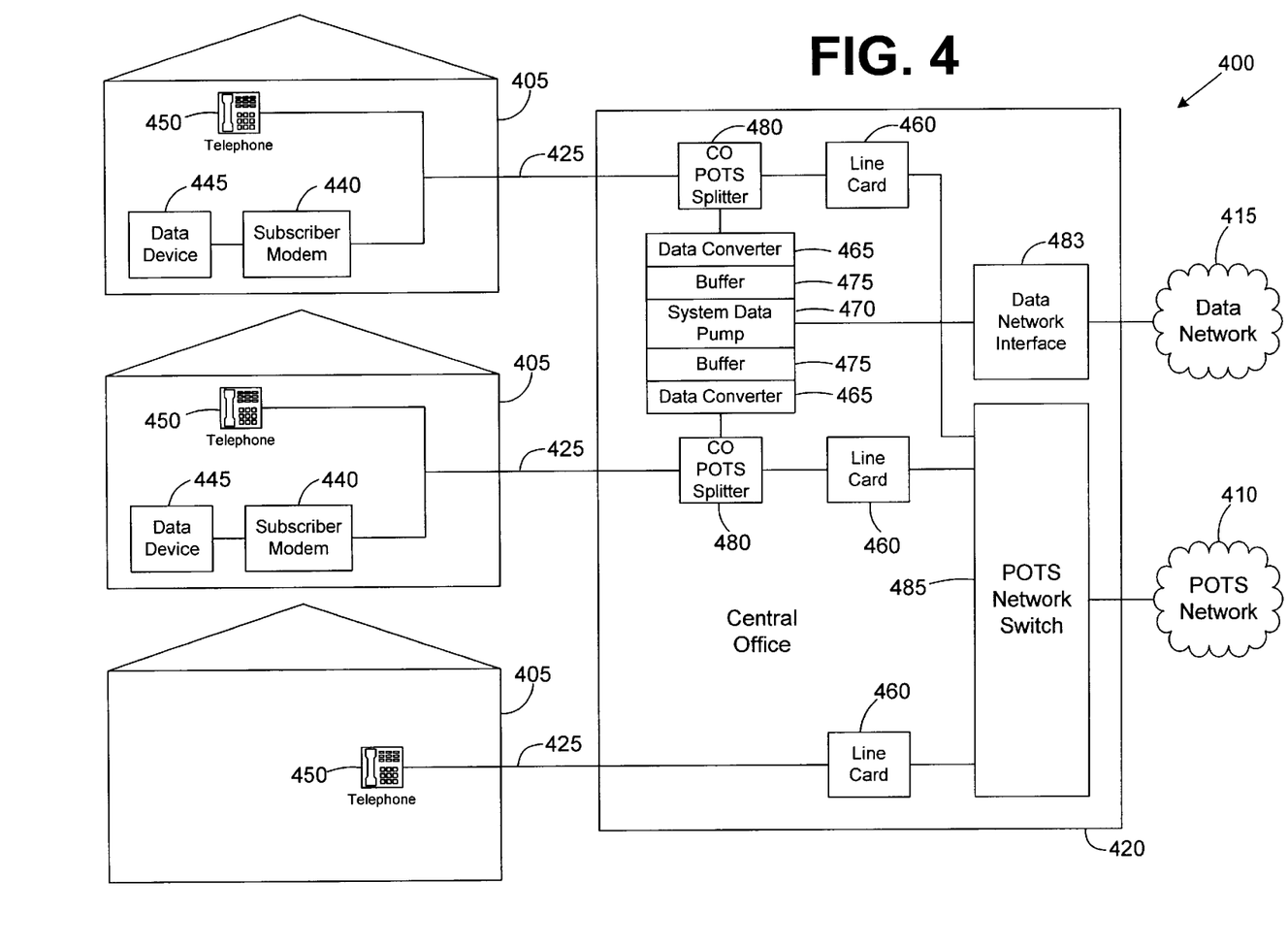
FIG. 4 is a schematic illustration of a communication system in accordance with an alternative exemplary embodiment of the present invention.

As used in connection with system 100, subscriber splitter 155 is suitably configured to multiplex and demultiplex voice and data information transmitted between subscriber 105 and central office 120. In particular, splitter 155 is preferably configured to demultiplex information received from line 125 or the like (into a format compatible with device 150 and modem 140) and to multiplex information from device 150 and modem 140 onto line 125 for upstream travel. Generally, both subscriber splitter 155 as well as system splitter 180 separate or superimpose voice and data information using frequency division multiplexing techniques. Although not shown in FIG. 1, a communication system in accordance with various embodiments of the present invention may not include splitter 155. A communication system including a system splitter coupled directly to a subscriber modem and voice band device is illustrated in FIG. 4 and described in more detail below.

Voice information that is separated from data information at system splitter 180 is preferably converted from analog format to digital format at converter 160 for upstream travel to POTS network switch 185 and voice network 110. Network switch 185 suitably includes a circuit switch matrix (e.g., a matrix consisting of both time division switching and space switching) to switch calls from device 150 in a circuit switch manner. Voice network 110 may include PSTN components such as additional central offices, additional voice band devices, and the like. In addition, voice information is preferably transformed from digital to analog format at converter 160 for downstream travel to splitter 180 and multiplexed with data information at splitter 180. Although converter 160 may be configured in a variety of ways, in accordance with an exemplary embodiment of the present invention, converter 160 is a PSTN line card.

Data information is similarly converted between analog and digital format at central office 120. In particular, after the data passes through splitter 180 in the upstream direction, the data information is converted at converter 165 into a digital format compatible with buffer 175 and data pump 170. In accordance with an exemplary embodiment of the present invention, converter 165 includes an analog front end configured to interface with line 125, a digital-to-analog converter, and an analog-to-digital converter for appropriate data transformation.

Each subscriber 105 desirous of high speed data transmission is connected to at least one converter 165 and one buffer 175. Multiple subscribers 105 may be coupled to more than one converter 165 and buffer 175. Subscribers not desiring data transmission service need not be connected to converters 165.

Each converter 165 is configured to communicate with at least one data pump 170 such that converters 165 transmit data in digital format to data pump 170 for upstream travel and receive data in digital format from pump 170 for downstream travel. In an exemplary embodiment of the present invention, more than one converter 165 is attached to data pump 170. Although not shown in the figures, multiple converters 165 may be connected to a plurality of data pumps 170. In such a case, data pumps 170 may be integrated such that various data pumps 170 communicate with each other. Because upstream information is converted into digital format before it is transmitted to buffer 175 and pump 170, pump 170 does not perform analog switching. Thus, problems associated with analog switching between various system modems or system modem pools are mitigated.

In an exemplary embodiment of the present invention, subscriber modem 140 and converter 165 have a one-to-one relationship and modem 140 and converter 165 are constantly coupled to each other. This configuration allows terminal 145 to constantly receive information from the data service (e.g., network 115). As a result, subscribers 105 may be notified upon receipt of information such as receipt of incoming e-mail or the like.

Buffer 175 is configured to store a fixed amount of information that buffer 175 receives from subscriber modem 140 for a period of time. For example, buffer 175 may store the information until pump 170 indicates that pump 170 is ready to receive the information. Buffer 175 may include any type of memory or storage device. In accordance with an exemplary embodiment of the present invention, buffer 175 is random access memory. As described in greater detail below, placing buffer 175 between modem 140 and pump 170 (in the upstream direction only) allows modem 140 to transmit up to a predetermined amount of information to pump 170 without pump 170 polling modem 140 or requiring modem 140 to wait for an acknowledgment from pump 170. This allows multiple subscribers 105 to transmit information towards pump 170 at about the same time, and modems 140 may transmit information in any order or sequence. Although the size of buffer 175 may vary from application to application, in accordance with an exemplary embodiment of the present invention, buffer 175 may be configured to hold about 133 frames of data (described in more detail below) or about 1.6 Mbits.

Although system 100 is conveniently illustrated in FIG. 1 with each converter 165 coupled to buffers 175, any combination of converters may be coupled to buffers 175. In addition, although not illustrated, multiple buffers 175 and/or multiple converters 165 may be integrated as a single device.

Data pump 170 is generally configured to facilitate transmission of payload information between subscriber 105 and network 115. In addition, as described below, pump 170 maintains control over upstream and downstream data transmission.

To facilitate transmission, data pump 170 is configured to modulate and demodulate data. Various techniques such as discrete multi-tone (DMT), carrierless amplitude phase (CAP), quadrature amplitude modulation (QAM), pulse amplitude modulation (PAM), or the like may be used to modulate and/or demodulate the data for transmission. Although data pump 170 is configured to transmit information between network 115 and multiple subscribers 105, pump 170 may be substantially similar to data pumps dedicated to a single subscriber 105, with the exception that the "improved" data pump is configured to store parameter settings for each subscriber modem 140 coupled to pump 170 and includes switches for converting to the appropriate parameters.

In accordance with an exemplary embodiment of the present invention, pump 170 is configured to generate a set of subscriber modem 140 parameters for each modem 140 serviced by pump 170. The parameters generally include modem 140 receiver gain, equalizer taps, timing offset, and the like. Pump 170 retrieves the stored parameters for a particular modem 140 as it receives a signal from buffer 175 corresponding to modem 140.

Although information transmitted from pump 170 to subscriber 105 is typically intended for only one subscriber 105, in accordance with an exemplary embodiment of the present invention, data pump 170 broadcasts all downstream information to all subscribers 105 attached to pump 170. Accordingly, information broadcast downstream from pump 170 generally includes information identifying modems 140 which are to decode the information and transmit data further downstream to terminal 145. In addition, the data preferably includes information that allows all modems 140 coupled to pump 170 to maintain synchronization with data pump 170.

Data sent between data pump 170 and subscriber 105 suitably includes a link protocol. In general, the link protocol provides a mechanism for increasing reliability of information transmission over a line such as line 125. In accordance with the present invention, the link protocol is used to identify modems 140 that are to receive particular information, to prevent more than a fixed or predetermined amount of information being sent to bit pump 170 at one time, and to allow downstream transmission to each subscriber modem 140 at or at about the maximum rate supported by a particular modem 140. Moreover, as described in greater detail below, the link protocol is used to provide control of upstream and downstream data transmission between subscriber 105 and pump 170.

Figure 2:
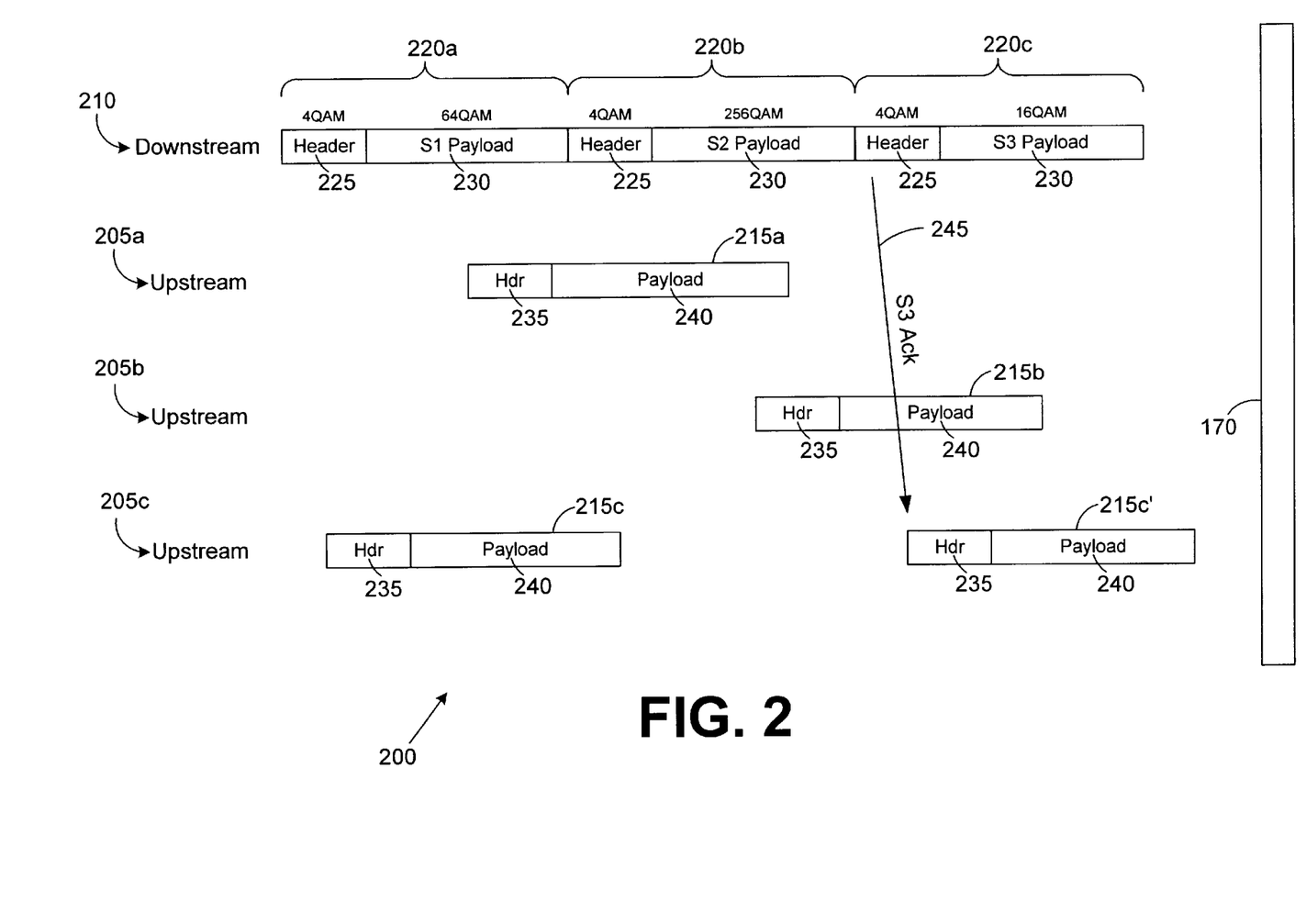
FIG. 2 is a schematic representation of upstream and downstream data transmitted over a portion of the communication system of FIG. 1.

FIG. 2 illustrates a schematic representation of information 200 transmitted using QAM between subscribers 205a–c and data pump 170 in accordance with an exemplary embodiment of the present invention. Information 200 suitably includes downstream data 210, which is transmitted from pump 170 to subscribers 205a–c (which include modems 140) and upstream data 215a–c and 215c', which is sent, respectively, from subscribers 205a, 205b, and 205c.

Downstream data 210 generally includes frames 220a–c (corresponding to subscribers 205a–c), and each frame 220a–c typically includes a header segment 225 and a payload segment 230. Frames 220a–c may also include a trailer (not shown) which includes additional information such as such as error correction information, e.g., cyclic redundancy checking (CRC) and/or identification information. To assist in maintaining synchronization between subscribers 205*a–c* and pump 170, all frames 220 may be transmitted for substantially the same amount of time. Synchronization may also be maintained in a variety of other ways. For example, the length of segment 220 may be set short enough such that baseband timing is maintained by each modem 140 decoding baseband information in the header. Alternatively, frames 220 may be configured to allow modems 140 to employ passband timing recovery techniques to maintain synchronization.

In accordance an exemplary embodiment of the present invention, header segment 225 includes address information to identify which modem or modems 140 are to decode the payload information (within payload segment 230) for further transmission downstream. Segment 225 also suitably contains parameter information such as downstream rate information (e.g., constellation density) for corresponding payload segment 230. In addition, segment 225 may include an acknowledgment 245 that informs one or more modems 140 that the intended modem(s) 140 may send additional information. Header segment 225 also preferably includes a preamble comprising the first few bits of segment 225. The preamble includes no data, but is used to restore synchronization between modem 140 and pump 170. The preamble may also allow pump 170 to flush out any equalizer and/or decoder delay prior to attempting to decode payload segment 230.

Header segment 225 is preferably configured such that information contained therein may be decoded by all modems 140 attached to data pump 170. Accordingly, information contained in header segment 225 is transmitted using a relatively low complexity and low data rate constellation that is preferably supported by all modems 140 operatively connected to data pump 170.

Payload segment 230 generally contains payload information to be received by modem 140 and ultimately received by device 145. Typically the payload information is intended for a single modem 140 identified in header segment 225. Because information within payload segment 230 is generally only intended for one modem 140, the payload information may be transmitted at a constellation complexity commensurate with modem 140 designated to receive the payload information. In other words, the payload information may be transmitted at the highest complexity constellation supported by modem 140 via line 125.

Upstream data (e.g., frames 215*a–c*) suitably includes a header segment 235 and a payload segment 240. Frame 215*a* and other upstream frames may also include additional information; for example upstream data 210 may include a trailer, which includes data such as error correction information, e.g., CRC, and the like.

Header segments 225 and 235 may include information that allows pump 170 to transmit information to modems 140 in any order, which may increase the efficiency of system 100. For example, header 225 may include a bit field with one or more bits assigned to each modem 140. This configuration allows pump 170 to simultaneously acknowledge information from more than one modem at a time. Header 225, header 235, or a combination thereof may further include requests for acknowledgment, diagnostics messages, and management messages.

In accordance with an exemplary embodiment of the present invention, data pump 170 transforms information serially from one converter 165 or buffer 175 at a time.

Polling techniques may be used to facilitate reception of information by pump 170 from one converter or one buffer 175 at a time. Alternatively, information from converter 165 (by way of buffer 175) may interrupt pump 170 and send information on demand. In this embodiment, upstream data 210 includes a request for attention from pump 170. Such a request may be in the form of a modified idle carrier within the upstream data or the like.

Buffer 175 facilitates efficient transmission from modem 140 to pump 170 by allowing modem 140 to send a predetermined amount of information upstream to a corresponding buffer 175 on demand; i.e., without modem 140 being polled or receiving an acknowledgment 245 from pump 170. However, as discussed in more detail hereinbelow, modem 140 must receive acknowledgment 245 from pump 170 prior to modem 140 transmitting additional information upstream. FIG. 2 illustrates a system that allows modem 140 to transmit a single unacknowledged frame (e.g., frame 215*a*) upstream at a time.

Because buffer 175 allows for information (acknowledged or unacknowledged) from one or more modems 140 to be transmitted at a given time, more information may be transmitted to converters 165 than can be processed by pump 170 during the same time period. As noted above, buffer 175 suitably stores the information until pump 170 is capable of processing the information or indicates that it is ready to receive the information.

Figure 3:
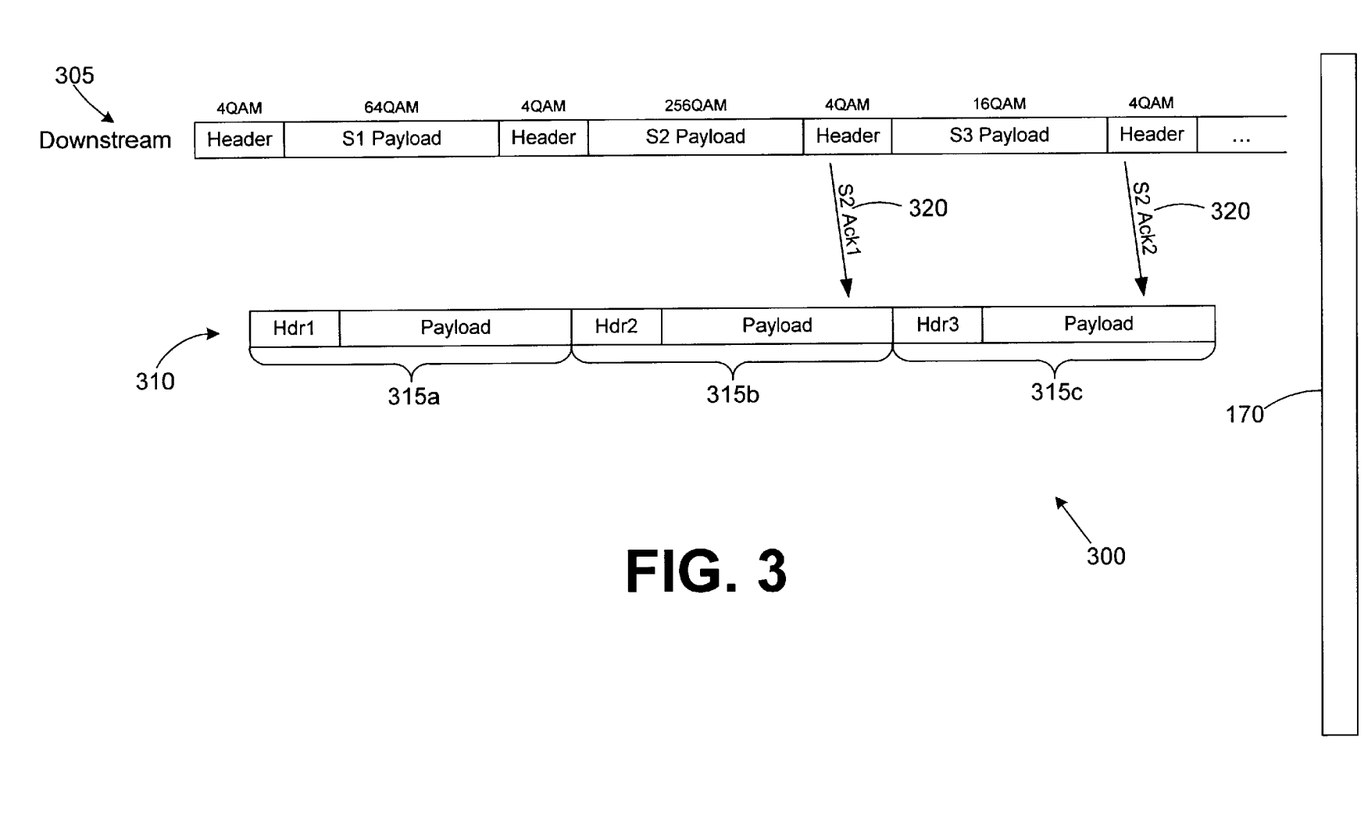
FIG. 3 is a schematic representation of upstream and downstream data transmitted over a portion of the communication system of FIG. 1 in accordance with an alternative embodiment of the present invention.

FIG. 3 schematically illustrates information 300, including downstream data 305 and upstream data 310 transmitted over communication system 100, in which two upstream frames 315*a–b* may be transmitted from modem 140 to a corresponding converter 165 without acknowledgment from pump 170. As pump 170 processes information from first frame 315*a*, it may transmit information to modem 140 that includes an acknowledgment 320, which informs modem 140 that modem 140 may transmit an additional frame such as frame 315*c*. In this case and as illustrated in FIG. 3, modem 140 may continuously send information to pump 170.

Several types of protocols may be used to facilitate data transmission between various components of system 100. In particular, digital subscriber line (xDSL) protocols may be used to facilitate transmission. The xDSL protocols may include asymmetric digital subscriber line (ADSL), symmetric digital subscriber line (SDSL), high-speed digital subscriber line (HDSL), and very high-speed digital subscriber line (VDSL). Some of these protocols may require multiple lines 125 between subscribers 105 and central office 120. Further, any frequency bands for voice and data transmission may be employed for the xDSL or other protocol transmission; however, the respective transmission bands are preferably chosen to minimize noise and interference between voice, data, or other signals. In accordance with an exemplary embodiment of the present invention, voice information is transmitted over a frequency band ranging from about 300 to 4000 Hz and data is transmitted over a frequency band ranging from about 25 KHz to about 1.1 MHZ.

In accordance with the present invention, subscriber modem 140 may include any device capable of transforming (modulating and demodulating) information for transmission between subscriber 105 and data pump 170. Modem 140 is generally configured to convert information between digital information capable of being received by terminal 145 and analog information suitable for transmission over line 125. For example, modem 140 may convert information from terminal 145 into an xDSL-compatible format such as ADSL.

A communication system 400 in accordance with an alternate embodiment of the present invention is illustrated in FIG. 4. System 400 includes subscribers 405 coupled to a voice network 410 and a data network 415 through a central site 420. In general, system 400 is configured to transmit data 200 and 300 as described above.

Similar to subscriber 105 illustrated in FIG. 1, subscriber 405 suitably includes a modem 440, a terminal 445, and a voice band device 450; however, systems 100 and 400 differ, in part, because system 400 does not include a subscriber splitter. In accordance with an exemplary embodiment of the present invention, modem 440 and device 450 suitably couple to line 425 through a common interface (e.g., an RJ-11) rather than at the subscriber splitter.

At central site 420, data and voice information are separated at splitter 480, which is typically located within or proximate central site 420. Once separated, voice and data information travel upstream to networks 410 and 415 in a manner similar to that described in connection with system 100. In particular, voice information travels from splitter 480 to a converter 460, to a network switch 485, and to voice network 410, while data travels from splitter 480 to a converter 465, to a buffer 475, to a pump 470, to an interface 483, and finally to network 415. Data travels in a reverse direction from networks 410 and 415 through central office 420 along the same path, with the exception that data does not travel through buffer 475 in the downstream direction.

In accordance with an exemplary embodiment of the present invention, subscriber modem 440 and pump 470 modulate and demodulate information using remote splitterless technology such as G.Lite digital subscriber line protocol (also known as splitterless DSL, DSL Lite, and Universal ADSL) to facilitate transmission of information over line 425. Because system 400 does not require a splitter at subscriber 405, system 400 generally costs less than a system such as system 100 which includes a subscriber splitter. However, transmission rates using G.Lite are often lower (e.g., in the range of about 1.5 Mbps) than transmission rates using ADSL.

Although the present invention is set forth herein in the context of the appended drawing figures, it should be appreciated that the invention is not limited to the specific form shown. For example, while the output of the system data pump is conveniently shown as connecting to a data network, the data pump may conveniently be attached to a separate terminal or the like. Various other modifications, variations, and enhancements in the design and arrangement of the communication system as set forth herein may be made without departing from the spirit and scope of the present invention as set forth in the appended claims.

What is claimed is:

1. A system for interfacing between a number of subscribers and a data service provider, comprising:
   a number of system splitters, each of the system splitters configured to receive electronic information from a corresponding one of the subscribers and separate said electronic information into a data band comprising an amount of upstream data information in an analog format and a voice band;
   a number of converters, each of the converters being operatively coupled to one of the system splitters, and each of the converters configured to convert the upstream data information from the analog format into a digital format, and, each of the converters configured to convert an amount of downstream data information from the digital format into the analog format;
   at least one system data pump operatively coupled to each of the converters, the at least one system data pump configured to modulate the upstream data information embodied in the digital format to assist transmission of said upstream data information embodied in the digital format; and
   at least one buffer memory operatively interposed in an upstream direction between said converters and said at least one data pump, said at least one buffer memory configured to store the upstream data information embodied in the digital format for a period of time.

2. The system of claim 1, wherein said at least one data pump modulates the upstream data information embodied in the digital format using quadrature amplitude modulation.

3. The system of claim 1, wherein said at least one data pump modulates the upstream data information embodied in the digital format using digital subscriber line techniques.

4. The system of claim 3, wherein said electronic information received by the system splitter is transmitted using an asymmetric digital subscriber line protocol.

5. The system of claim 1, wherein said at least one buffer memory is configured to store about 1.6 Mbits.

6. The system of claim 1, wherein said at least one data pump is further configured to broadcast the downstream data information simultaneously to each of the converters operatively coupled to said at least one data pump, the downstream data information broadcast to each of the converters being identical, wherein said downstream data information includes information to indicate which one of the subscribers is to demodulate said downstream data information.

7. The system of claim 1, further comprising a subscriber splitter operatively coupled to one of said system splitters via a transmission line, wherein said subscriber splitter is configured to multiplex information from the subscriber onto the transmission line.

8. The system of claim 1, wherein said at least one buffer memory includes a random access memory.

9. The system of claim 1, wherein said at least one system data pump is further configured to store parameter information corresponding to each one of a plurality of a subscriber modems, each of the subscriber modems being coupled to one of the system splitters.

10. A method for interfacing between a number of subscribers and a data service provider, comprising the steps of:
    receiving a number of upstream data signals embodied in an analog format in a corresponding number of converters, each of the upstream data signals being transmitted by one of the subscribers;
    transforming each of the upstream data signals from the analog format into a digital format using the corresponding number of converters, respectively;
    storing each of the upstream data signals in the digital format in a buffer;
    accessing the upstream data signals with at least one data pump and modulating the upstream data signals for transmission to the data service provider;
    demodulating a downstream data signal embodied in a digital format from the data service provider and applying the downstream data signal in the digital format simultaneously to each of the converters with the at least one data pump, wherein the same downstream data signal is applied to each the converters; and
    transforming the downstream data signal from the digital format into the analog format in each of the converters.

11. The method of claim 10, further comprising the step of transmitting the downstream data signal in the analog format from each one of the converters to each of the subscribers, wherein the downstream data signal includes an amount of information that identifies an intended recipient of the downstream data signal.

12. The method of claim 10, wherein the step of receiving the number of upstream data signals embodied in the analog format in the corresponding number of converters further comprises receiving the number of upstream data signals embodied in the analog format in the corresponding number of converters concurrently.

13. The method of claim 10, further comprising the step of storing a set of parameters for each one of a number of modems using the at least one data pump, each of the modems being employed by one of the subscribers.

14. The method of claim 13, further comprising the step of retrieving the set of parameters with the at least one data pump, the set of parameters being associated with one of the modems to which the downstream data signal is to be transmitted.

* * * * *

UNITED STATES PATENT AND TRADEMARK OFFICE
CERTIFICATE OF CORRECTION

PATENT NO. : 6,754,233 B1
DATED : June 22, 2004
INVENTOR(S) : Henderson et al.

It is certified that error appears in the above-identified patent and that said Letters Patent is hereby corrected as shown below:

Column 12,
Line 37, delete the word "a" between the words "of" and "subscriber".

Signed and Sealed this

Fifth Day of October, 2004

JON W. DUDAS
*Director of the United States Patent and Trademark Office*